E. J. MILLER.
KNIFE DIRECTOR AND GUIDE GAGE.
APPLICATION FILED OCT. 21, 1920.

1,378,551.

Patented May 17, 1921.

Inventor
Eli J. Miller
by Chas. C. Stauffer
Attorney.

UNITED STATES PATENT OFFICE.

ELI J. MILLER, OF YORK, PENNSYLVANIA.

KNIFE DIRECTOR AND GUIDE-GAGE.

1,378,551.    Specification of Letters Patent.    Patented May 17, 1921.

Application filed October 21, 1920. Serial No. 418,539.

*To all whom it may concern:*

Be it known that I, ELI J. MILLER, a citizen of the United States, residing at York, in the county of York and State of Pennsylvania, have invented certain new and useful Improvements in Knife Directors and Guide-Gages, of which the following is a specification.

My invention relates to a device for guiding a knife in slicing bread, cake, cold porridge, scrapple, meats, and similar object of food, or of other materials which it is desired to cut of an approximately even thickness without bearing too hard upon the previously cut surface of the bread or other material. It is particularly designed for slicing bread.

The slicing of bread is quite an art, particularly in the hands of children or unskilled or careless persons, and it is very desirable that they have some slight gage or guide by which to mark the thickness and beginning of each slice. At the same time it is desirable that this device be simple, and inexpensive in the extreme, while it enables the performer to do the work well and rapidly, be he skilled or unskilled.

My device is particularly adapted for use with the ordinary knife and the ordinary motion of cutting wherein the final stroke is generally a downward and backward draw cut.

My device is one that offers no obstruction to other uses of the knife if so desired, and it is one that can be readily removed or turned aside when the edge of the knife is to be renewed on the whetstone, grinding stone, steel, or other implement or machine. My device is also adjustable to cut slices of various thickness, as people prefer them, for toast or sandwiches, or plain bread and butter.

Figure 1:
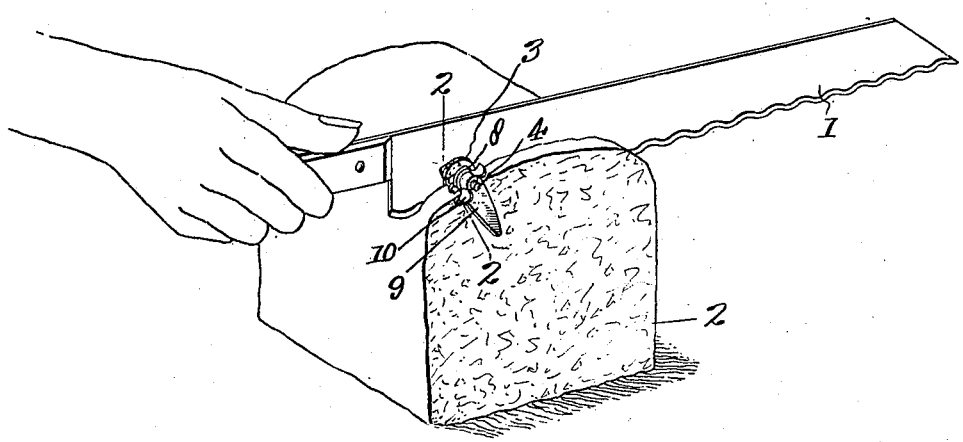
Figure 1 is a perspective view of a loaf of bread undergoing slicing by my knife and guide.
Figure 2:
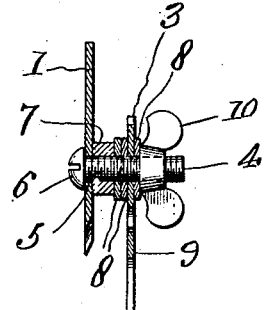
Fig. 2 is a section on the line 2—2 of Fig. 1 of the same implements.
Figure 3:
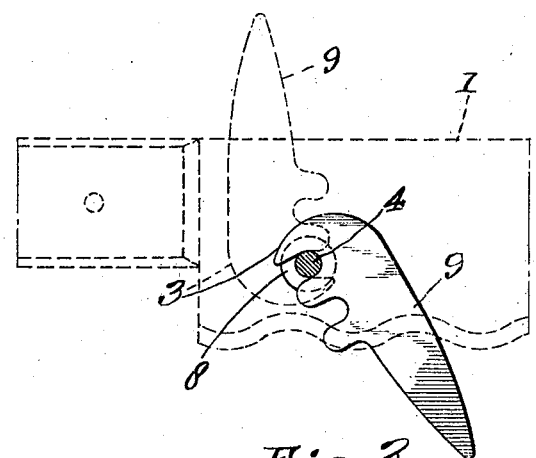
Fig. 3 is a view on a somewhat larger scale, showing a portion of the knife blade with the guide attached.

In the drawing, 1 represents an ordinary knife blade, 2 a loaf of bread, 3 a general view of my gage or guide, 4 is a bolt attached to the knife blade 1 and clamped thereto, passing through a hole 5 in the said blade. This bolt clamps the blade between its head 6 and nut 7, and holds it firmly against the blade. I provide a number of washers 8, loose on the bolt, and I locate my gage blade 9, which is the gage proper, between these washers 8 at any desired point. I make this blade of the form shown in Fig. 3, with a series of deep cut notches, and the bolt 4 may pass through any one of these notches so that the gage blade or guide extends to a greater or less distance below the knife blade. Instead of notches I may use holes.

I provide a thumb nut 10 on the end of the bolt 4, and by merely turning this thumb nut sufficient to loosen it, the blade 9 can be removed or shifted in position and clamped there with a minimum of exertion and loss of time. It may be turned upward as shown in dotted lines in Fig. 3, or downward.

It will be seen that I have thus created a device that is very simple to operate and take care of, one which is easily understood, and one whose use facilitates the cutting of bread or other material, such as mush to be fried, into slices of well regulated thickness.

The device being as shown, located at the rear of the blade, is out of the way. The ordinary operation of cutting bread rapidly is accomplished by a series of swift slicing motions to and from the operator, usually two or three such motions being made during the cutting of a single slice. If, now, there are obstructions along the body of the blade, as is the case with many of the patented gages for bread slicing operations, the forward clamp or post, if one be used, will be decidedly in the way of permitting the proper draw cut to get the slice separated from the loaf. By locating my guide at the extreme rear of the blade and near the handle, and it may well in some instances be attached to or made a part of the handle itself, I avoid all these difficulties. A mere touch of the gage blade against the cut face of the loaf is sufficient to determine the position of the knife blade with respect to the next cut; and as the knife is worked through the bread and at the close of each individual stroke is drawn backward or thrust forward with the handle slightly raised as is the usual and normal way of doing the operation, the slice is detached and falls to one side clear of both the loaf and of the knife.

In fact my device is as easy to use for the purpose as a plain knife with the additional feature that it enables the operator to cut a series of even slices rapidly, that is without pausing before each slice to adjust his knife carefully to the required point. The guide 9 does this for him.

I have found it desirable to make my knife guide adjustable, and to this end I have provided it with several notches, in one of which the screw 4 may pass so that the end of the knife guide is always below the edge of the knife. By having these notches deep enough the guide is held securely, and its adjustment to a different notch, or its removal from the post, is easily effected. It may also obviously be adjusted to different angles.

Having thus described my invention, what I claim and desire to secure by Letters Patent of the United States is:

1. In a knife director and guide for cutting slices of regular thickness, a knife blade, a post attached to said knife blade at the rear and near the handle, a series of washers adjustable along said post, a notched gage blade adjustable between the washers on said post in any of the several notches, and means on the post for clamping the guide blade between the washers.

2. In a knife director and guide for slicing bread, in combination, a knife blade, a screw threaded post clamped to said knife blade at the handle end of said blade, means on said post for adjusting a guide to and from the knife blade, and means for clamping said guide in its adjusted position, said guide adapted to touch the face of the loaf about to be cut in order to determine the cutting position of the knife blade, and to be withdrawn from contact with said face at the termination of the cutting stroke or strokes.

3. In a knife director and guide, in combination, a knife blade, a post attached to said knife blade, said post being screw threaded, a series of washers strung upon said post, a deeply notched guide mounted upon said post and adjustable to any of said notches between successive washers, and a thumb nut for clamping the guide in any desired position with its end extending below the lower edge of the knife blade.

4. In a knife director and guide for cutting slices uniformly thick, from a loaf, a cutting blade, a post attached to said blade at the rear of the blade and extending outward from the blade, a series of washers adjustable along said post, a removable notched guide adjustable about and along the post between said washers and to any notch, and a thumb nut for holding said notched guide clamped in any position along the post or at any angle about the post desired.

5. In an adjustable knife director and guide gage and knife for slicing articles, in combination, a knife blade and handle, a post positioned at the rear, a series of washers, mounted on said post, a slice guide mounted on said post, adjustable about the post to extend to or below the edge of the knife blade, said gage adjustable between the washers to vary the thickness of the slices, and means to clamp the gage in position upon the post, the gage being adapted to determine the thickness at the start merely, of the slicing act.

In testimony whereof, I affix my signature.

ELI J. MILLER.